July 25, 1967   H. J. BRUCKER   3,332,122
STRAP END CONNECTOR
Filed March 10, 1965
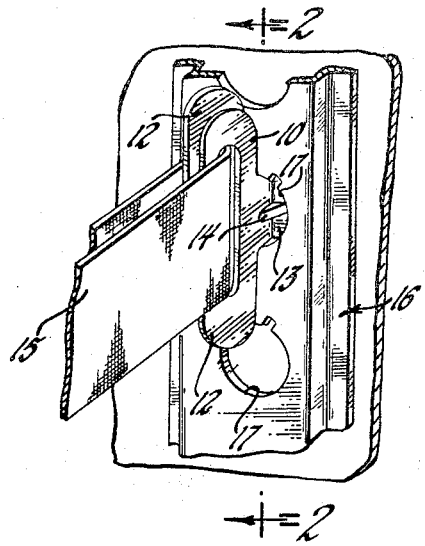
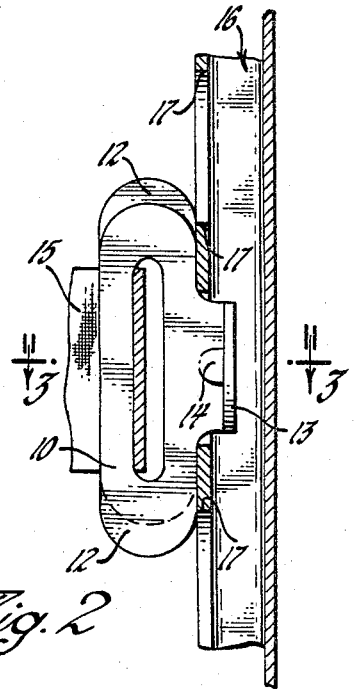
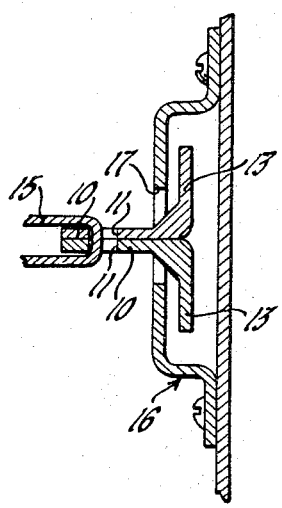
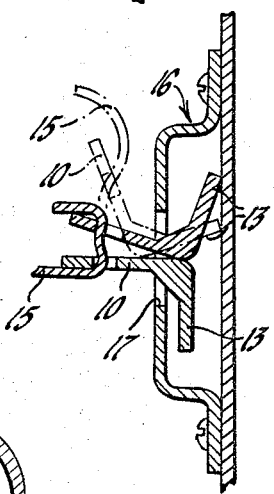
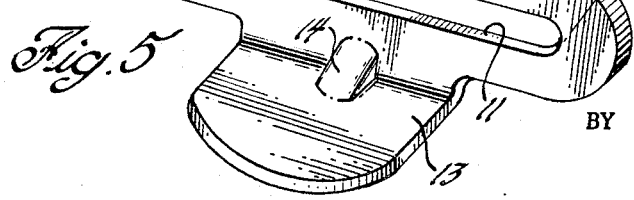
INVENTOR
Henry J. Brucker
BY Harry B. Rook,
ATTORNEY

3,332,122
STRAP END CONNECTOR
Henry J. Brucker, Summit, N.J., assignor to American Aluminum Company, Mountainside, N.J., a corporation of New Jersey
Filed Mar. 10, 1965, Ser. No. 438,679
2 Claims. (Cl. 24—265)

The present invention is a connector comprising a separable fastener operative to anchor an end of a flexible strap or the like to a fixed support such as a wall, floor of an anchor member mounted thereon.

Known prior art connectors serving such purpose include a pair of members of identical configuration arranged in abutting side-by-side relation, each having a slot for passage of the bight of an end loop of a strap by which the members are carried. The members have oppositely directed perpendicular flanges for insertion separately through a narrow vertical or horizontal slot in the front face of a fixed support, and when the members are brought together the flanges bear against the rear face of the support and lock the connector against detachment until the strap is released from tension and its loop enlarged to permit separation of the members and their appropriate angling to position the flanges for withdrawal through the support slot.

The present invention is an improvement upon such prior art connectors. Whereas the prior art had no provision for disposing the strap in other than a vertical or horizontal plane, the present invention provides a connector by which the plane of the strap may be disposed at any desired angle relative to the vertical or horizontal; thus enabling a greater range of adjustability and utility than is possible with prior art connectors.

The present invention provides also a novel connector arrangement wherein the pair of connector members have each a finger grip portion at one end, which finger grip portions extend longitudinally from opposite ends of the connector when assembled and with each finger grip portion projecting beyond the adjacent end of the companion member of the pair.

As another object the invention provides a connector comprising a superposed pair of identical body members with anchor support engageable lugs that are automatically maintained in operative alignment by self-contained means constituting an element of the assembled connector when in service.

Other and incidental objects will be apparent from the following description in conjunction with the accompanying drawings in which:

FIG. 1 is a fragmentary perspective view of the strap end connector in service attachment to a support.

FIG. 2 is a sectional view taken on line 2—2 of FIG. 1.

FIG. 3 is a sectional view taken on line 3—3 of FIG. 2.

FIG. 4 is a view similar to FIG. 3 but illustrating, partly in dotted line, the manner in which the connector is attached to and disengaged from the support.

FIG. 5 is an exploded perspective view of the connector.

As shown in FIG. 5, the connector comprises a pair of identical elements each consisting of an oblong, flat body member 10 provided with a closed end slot 11 longitudinally therein which, at one end, terminates inwardly from the adjacent end of the body member a distance substantially twice the distance between the opposite end of the slot and its adjacent end of the body member. This arrangement provides a finger grip portion 12 at one end of the body member which is of greater area and longitudinal extent than that portion of the body member beyond the opposite end of the slot.

A lug 13 integral with the body member extends laterally from a side edge thereof substantially perpendicular thereto and midway between the ends of the slot 11. It is preferred that the lug body member be strengthened against bending stress by means of an integral reinforcing web or rib 14 at the center of the line of bend between the body member and lug, but its presence is optional.

The length and width of the slot 11 are such that a strap 15 may be passed freely therethrough. The term "strap" as used herein means any flexible belt, webbing, chain, rope or the like that is passed through the slot and doubled upon itself as a loop for securing it to the connector. The strap and connector are united in service relation by placing a pair of the members 10 together in face contact such that their respective finger grip portions 12 will be disposed at opposite ends of the assembly; shifting them longitudinally to bring their slots 11 into registry; passing the strap through the aligned slots; and doubling the strap upon itself in a direction away from the lugs 13 to constitute an end loop in which the connector is disposed.

When the slots 11 of a pair of body members 10 are aligned in registry their respective lugs 13 will extend oppositely in a common plane as shown in FIG. 3, and midway between the opposite ends of the connector assembly. Also, as shown in FIG. 2, the adjacent ends of the body members will be overlapped at each end, with the finger grip portion 12 of one body member extending longitudinally appreciably beyond the subjacent end of the other body member.

A service usage of the connector is shown in FIGS. 1–4 for purpose of illustration, but not restriction. As shown, the connector assembled in an end loop of a strap 15 is adapted to be anchored in a support, designated generally as 16, such as a wall, partition, or wall-attached channel track, of the character shown in my prior copending application Ser. No. 433,942, filed Feb. 19, 1965, now Patent No. 3,278,149. The support 16 is provided with a connector receiving aperture 17, here shown as circular, but which could be a slot or of any desired configuration, through which the lugs 13 are inserted by manipulation in the manner shown in FIG. 4. With the strap loop spread, the body members may easily be separated so that their respective lugs 13 can be inserted individually in and through the aperture. Then, when the strap is placed under tension, its end loop constricts and pulls the members 10 together in abutting face contact as shown in FIG. 3 whereby the lugs 13 will be moved into coplanar, oppositely directed positions such that their outer faces will bear against and override the marginal area of the aperture at the inner face of the support.

In the embodiment of the invention shown in the drawings herein, each lug 13 is centered relative to the slot 11 of its associated body member 10; so that, when the slots of the pair of body members comprising a connector are aligned in complete registry, the lugs are in alignment in opposite directions substantially in a plane perpendicular to the superposed body members, as shown in FIG. 3.

A feature of the invention is the fact that the connector can swivel in the support so that the strap may be disposed with its plane at any desired angle relative to the vertical or horizontal axis of its established connection with the anchoring support. Such a wide range of adjustment is not possible in prior art connections employing vertical or horizontal slot apertures in the support.

Uniform distribution of stress and maximum resistance to the strain of live load on the strap is obtained when the lugs 13 of a support-attached connector are in alignment. The maintenance of such alignment is accomplished in the present invention in either of two ways or in a combination of both. One may be effected by engagement of the side edges of the strap against the ends of the slots 11 to hold the superposed body members 10 against relative longitudinal shifting. The other may be effected by engagement of the side edges of the lugs 13 against the adjacent edge of the support aperture 17 in which the connector is mounted.

It is within the purview of the invention and intended that, if desired, the width of a strap may be appreciably less than the length of a slot 11 and/or the width of a lug 13 may be appreciably less than the coplanar extent of the support aperture through which it is inserted. In either case, the connector lugs may be aligned by appropriate manual longitudinal shifting of the body members 10 through their finger grip portions 12, and when the strap is tensioned longitudinally the bight of its loop will exert a pull against the superposed body members sufficient in strength to hold the body members against relative shifting movement.

The finger grip portions 12 of the body members, each of which is offset beyond the adjacent end of the other body member, enable easy manipulation of the body members for relative tilting and thereby greatly facilitate insertion and withdrawal of their lugs 13 through a selected anchor support aperture 17. Each body member may be moved independently of the other.

In its broader aspects, the present invention is fundamentally a separable fastener comprising a fixed support 16 provided with a socket 17 for receiving a head 10–13 carried by a flexible strap 15 whereby to anchor an end of the strap in the support by tensioning the strap to exert a longitudinal pull outwardly from the connection.

It is to be understood that the herein disclosed embodiment of my invention is illustrative of a practical example and that the invention is not restricted thereto. It may comprise any structure falling within the scope of the invention as claimed.

I claim:

1. A strap end connector comprising a pair of flat, oblong body members in abutting juxtaposition, each being movable on and relative to the other, each having a closed end slot extending longitudinally therein and in registry with the slot in the other, the longitudinal extent of each body member beyond one end of its slot being greater than at the opposite end of the slot to constitute a finger grip portion, each body member having a lug extending from a side edge thereof substantially perpendicular to the body member and midway between the ends of its slot to extend through an opening in a support, said lugs extending in alignment in opposite directions with said body member disposed at one side of the support and with said lugs in abutting relation to the other side of the support, said finger grip portions being at opposite ends of the connector, and the finger grip portion of each member projecting longitudinally beyond the adjacent end of the other member.

2. A combination of a support having a circular opening therethrough, a strap end connector comprising a pair of flat oblong body members in abutting juxtaposition, each being movable on and relative to the other, each having a closed end slot extending longitudinally therein and in registry with the slot in the other, the longitudinal extent of each body member beyond one end of its slot being greater than at the opposite end of the slot to constitute a finger grip portion, each body member having a lug extending from a side edge thereof substantially perpendicular to the body member and midway between the ends of its slot, said lugs extending loosely through said opening in said support in opposite directions in alignment with each other and with said body members disposed at one side of said support and with said lugs in abutting relation to the other side of the support, and a strap end having its bight in and through said slots, said body members being rotatable together in said opening to dispose the strap with its plane at any desired angle relative to the horizontal or the vertical axis of its established connection with said support.

References Cited
UNITED STATES PATENTS

| | | | |
|---|---|---|---|
| 1,917,917 | 7/1933 | Bales | 248—243 X |
| 2,382,474 | 8/1945 | Gambo | 52—361 X |
| 2,845,680 | 8/1958 | Elsner | 24—265 |
| 2,923,565 | 2/1960 | Klebe. | |

WILLIAM FELDMAN, *Primary Examiner.*

E. SIMONSEN, *Assistant Examiner.*